(12) United States Patent
Kotalwar et al.

(10) Patent No.: US 8,630,615 B2
(45) Date of Patent: *Jan. 14, 2014

(54) METHOD AND APPARATUS FOR RELIABLE TRANSMISSION OF CHARGING DETAIL RECORDS

(75) Inventors: Jayant Kotalwar, Sunnyvale, CA (US); Venu Hemige, San Ramon, CA (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,669

(22) Filed: Jul. 16, 2012

(65) Prior Publication Data

US 2012/0289189 A1 Nov. 15, 2012

Related U.S. Application Data

(63) Continuation of application No. 12/834,170, filed on Jul. 12, 2010, now Pat. No. 8,270,943.

(51) Int. Cl.
*H04W 4/24* (2009.01)

(52) U.S. Cl.
USPC .............................. 455/406; 714/11; 705/34

(58) Field of Classification Search
USPC ........ 455/406; 705/34, 412; 714/11; 370/229
See application file for complete search history.

(56) References Cited

U.S. PATENT DOCUMENTS

2010/0257077 A1* 10/2010 Cai et al. ........................ 705/34
2011/0010581 A1 1/2011 Tanttu et al.

FOREIGN PATENT DOCUMENTS

EP 2 107 464 A1 10/2009
WO WO 2009/055965 A1 5/2009

OTHER PUBLICATIONS

The International Search Report and the Written Opinion of the International Searching Authority, or the Declaration, in PCT/US2011/043489; mailed Apr. 26, 2012 ; Alcatel Lucent, Applicant; 14 pages.
"$3^{rd}$ Generation Partnership Project; Technical Specification Group Services and System Aspects; Telecommunication management; Charging management; Diameter charging applications (Release 9)," 3GPP Standard; 3GPP TS 32.299, $3^{rd}$ Generation Partnership Project (3GPP), Mobile Competence Centre; 650, Route Des Lucioles; F-06921 Sophia-Antipolis Cedex; France, No. V9.4.0, Jun. 16, 2010, pp. 1-148, XP050441831, [retrieved on Jun. 16, 2010].

(Continued)

*Primary Examiner* — Phuoc H Doan
(74) *Attorney, Agent, or Firm* — Wall & Tong, LLP (57) ABSTRACT

A charging detail record transmission capability is provided herein. A mobile gateway (MG) generates charging detail records (CDRs) intended for delivery to a charging gateway function (CGF). The CDRs are propagated toward both a first and second charging data function (CDFs). The first and second CDFs buffer the CDRs. The first CDF is configured for propagating CDRs toward the CGF. The second CDF is configured for propagating CDRs toward the CGF when the first CDF fails. The CGF is configured for acknowledging receipt of CDRs to the first or second CDF from which the CDRs are received. The first CDF is configured for acknowledging, to the second CDF, receipt of acknowledgment messages from the first CDF. The second CDF is configured for, upon failure of the first CDF, initiating a process for determining which of the CDRs buffered at the second CDF need to be propagated to the CGF.

18 Claims, 7 Drawing Sheets

(56) References Cited

OTHER PUBLICATIONS

3GPP: "3rd Generation Partnership Project; Technical Specification Group Service and System Aspects; Telecommunication management; Charging management; Charging Data Record (CDR) transfer; (Release 6)," 3GPP Draft; 32295-100, 3rd Generation Partnership Project (3GPP), Mobile Competence Centre; 650, Route Des Lucioles; F-06921 Sophia-Antipolis Cedex; France, vol. TSG SA, No. Montreal, Canada; Sep. 10, 2004, XP050203164, [retrieved on Sep. 10, 2994].

* cited by examiner

METHOD AND APPARATUS FOR RELIABLE TRANSMISSION OF CHARGING DETAIL RECORDS

CROSS-REFERENCE TO RELATED APPLICATION

This application is a continuation of U.S. patent application Ser. No. 12/834,170, filed Jul. 12, 2010 now U.S. Pat. No. 8,270,943, entitled METHOD AND APPARATUS FOR RELIABLE TRANSMISSION OF CHARGING DETAIL RECORDS, which application is hereby incorporated herein by reference.

FIELD OF THE INVENTION

The invention relates generally to communication networks and, more specifically but not exclusively, to transmission of charging detail records of communication networks.

BACKGROUND

In many communication networks, charging detail records (CDRs) are used by service providers as a basis for billing customers. In general, CDRs are formatted collections of information about chargeable events (e.g., the time of setup of a call, the duration of a call, an amount of data transferred via a connection, and the like). In many mobile communication networks, CDRs typically are generated by the mobile gateway (MG), which forwards the CDRs to a charging data function (CDF), which in turn forwards the CDRs to a charging gateway function (CGF). Disadvantageously, however, when the CDF fails, CDRs that were buffered by the CDF for transmission to the CGF at the time of failure may be lost, thereby resulting in lost revenue for the service provider.

SUMMARY

Various deficiencies in the prior art are addressed by embodiments for reliable transmission of charging detail records (CDRs). A mobile gateway (MG) generates CDRs intended for delivery to a charging gateway function (CGF). The CDRs are propagated toward both first and second charging data function (CDFs). The first and second CDFs buffer the CDRs. The first CDF is configured for propagating CDRs toward the CGF. The second CDF is configured for propagating CDRs toward the CGF when the first CDF fails. The CGF is configured for acknowledging receipt of CDRs to the first or second CDF from which the CDRs are received. The first CDF is configured for acknowledging, to the second CDF, receipt of acknowledgment messages from the first CDF. The second CDF is configured for, upon failure of the first CDF, initiating a process for determining which of the CDRs buffered at the second CDF need to be propagated to the CGF in order to ensure that none of the CDRs generated by the MG are lost due to the failure of the first CDF.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A charging detail record transmission capability is depicted and described herein. The charging detail record transmission capability provides reliable transmission of charging detail records from a mobile gateway to a charging gateway function, even upon failure of a charging detail function responsible for propagating charging data records from the mobile gateway to the charging gateway function, thereby ensuring reliable delivery of the charging detail records to one or more systems configured for processing the charging detail records to provide various accounting functions, billing functions, and the like, as well as various combinations thereof.

The charging detail record transmission capability may be provided within any communication network in which charging detail records or similar charging data are propagated for use by one or more systems configured for providing various accounting functions, billing functions, and the like, as well as various combinations thereof.

The charging detail record transmission capability is primarily depicted and described herein within the context of a specific type of wireless network (namely, a Third Generation Partnership Project (3GPP) Universal Mobile Telecommunication System (UMTS) network), however, it will be appreciated that the charging detail record transmission capability may be implemented within charging architectures of various other types of networks (e.g., other types of wireless networks, wireline networks, and the like).

Figure 1:
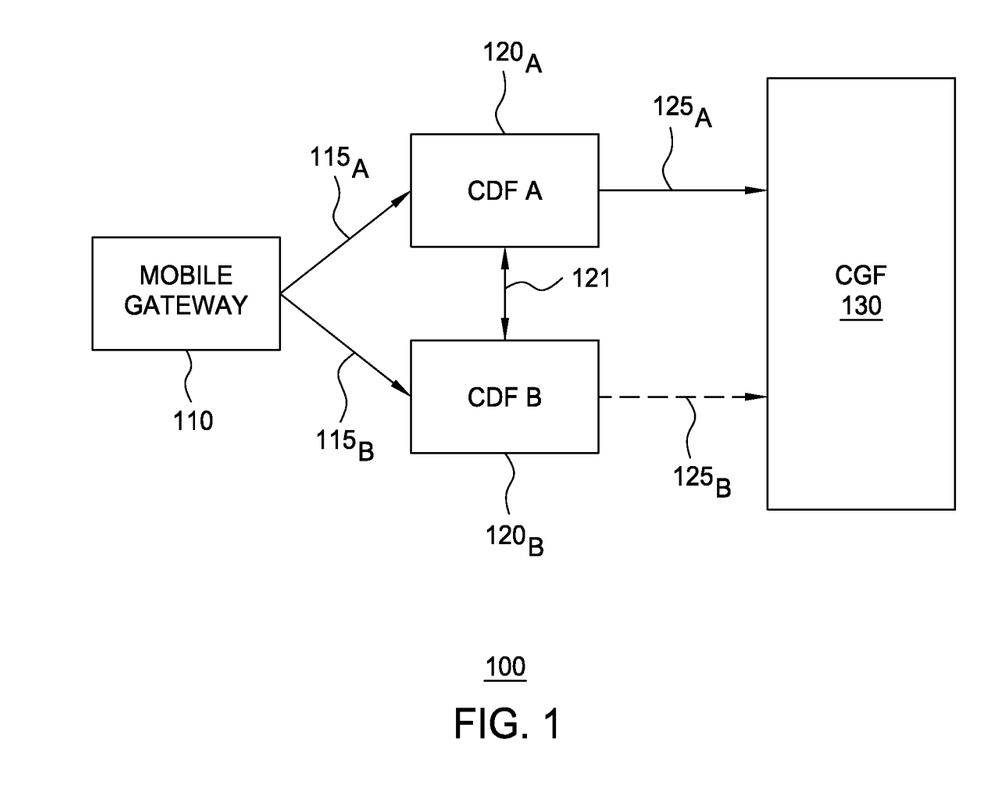
FIG. 1 depicts a high-level block diagram of an exemplary charging architecture.

FIG. 1 depicts a high-level block diagram of an exemplary charging architecture.

The charging architecture 100 includes a mobile gateway (MG) 110, first and second charging data functions (CDF) $120_A$ and $120_B$ (collectively, CDFs 120), and a charging gateway function (CGF) 130.

The MG 110 communicates with first CDF $120_A$ via a communication path $115_A$ and communicates with second CDF $120_B$ via a communication path $115_B$. The first and second CDFs $120_A$ and $120_B$ communicate via a communication path 121 therebetween. The first and second CDFs $120_A$ and $120_B$ communicate with CGF 130 via communication paths $125_A$ and $125_B$, respectively.

In one embodiment, charging architecture 100 is implemented within a 3GPP UMTS network. The MG 110 may be any suitable network element within the 3GPP UMTS network, such as a Gateway GPRS Support Node (GGSN), a Serving GPRS Support Node (SGSN), or any other network element associated with the 3GPP UMTS network. The interfaces between CDFs $120_A$ and $120_B$ and CGF 130, via respective communication paths $125_A$ and $125_B$, may be Ga interfaces. The protocol used for exchanging messages over the Ga interfaces may be the GPRS Tunneling Protocol (GTP) prime (GTP') protocol, the typical operation of which will be understood by one skilled in the art. In one embodiment, the charging architecture 100 may be implemented as a modified version of the 3GPP TS 32.240 charging architecture.

The MG 110 generates charging detail records (CDRs). The CDRs include details about chargeable events, e.g., for use in accounting functions, for use in billing customers, and the like. For example, for each chargeable event, the associated CDR may include details such as the time of call setup, the duration of the call, the amount of data transferred, and the like, as well as various combinations thereof. The types of information included within CDRs, formatting of CDRs, and like details of CDRs will be understood by one skilled in the art. The CDRs have unique sequence numbers associated therewith.

The MG 110 propagates each CDR to both first CDF $120_A$ and second CDF $120_B$. The CDRs may be propagated in any suitable manner. In one embodiment, for example, the CDRs are propagated using respective CDR packets, where the CDR packets conveying the CDRs include the unique sequence numbers associated with the CDRs.

The first and second CDFs $120_A$ and $120_B$ receive the CDRs from MG 110. The first and second CDFs $120_A$ and $120_B$ each buffer the received CDRs.

The first CDF $120_A$ is the primary CDF and the second CDF $120_B$ is the secondary CDF. The first CDF $120_A$ has an active connection with CGF 130 via communication path $125_A$. The second CDF $120_B$ does not have an active connection with CGF 130. The active connection between first CDF $120_A$ and CGF 130 may be supported using any suitable protocol. In one embodiment, for example, the active connection between the first CDF $120_A$ and the CGF 130 may be supported using the GTP' protocol.

The first CDF $120_A$ begins sending the buffered CDRs to CGF 130 via the active connection established between first CDF $120_A$ and CGF 130. In one embodiment, the CDRs are sent from first CDF $120_A$ to CGF 130 using the GTP' protocol. The second CDF $120_B$ continues to buffer the CDRs, but does not send the CDRs to CGF 130.

The CGF 130 receives the CDRs from first CDF $120_A$ and, for each CDR successfully received from first CDF $120_A$, replies to first CDF $120_A$ with an associated acknowledgment message. The acknowledgment message for a CDR includes the associated sequence number of the CDR.

The first CDF $120_A$ receives the acknowledgment messages from CGF 130.

The first CDF $120_A$ deletes successfully delivered CDRs from its buffer in response to receiving acknowledgment of successful delivery (as determined from the sequence numbers of the CDRs, which are included within the acknowledgment messages received from CGF 130).

The first CDF $120_A$ notifies second CDF $120_B$ of each CDR that is acknowledged by CGF 130 as having been received by CGF 130, thereby providing second CDF $120_B$ with information indicative of which of the CDRs received and buffered at second CDF $120_B$ have been successfully delivered to CGF 130. The first CDF $120_A$ may notify second CDF $120_B$ of successful delivery of a CDR in any suitable manner (e.g., by forwarding the associated acknowledgment message received from CGF 130 to second CDF $120_B$, by generating an acknowledgment message and sending the acknowledgment message to second CDF $120_B$, and the like).

The second CDF $120_B$ receives the notifications from first CDF $120_A$, such that second CDF $120_B$ has information indicative of which of the CDRs received and buffered at second CDF $120_B$ have been successfully delivered to CGF 130. The second CDF $120_B$ deletes successfully delivered CDRs from its buffer (as determined from the notifications received at the second CDF $120_B$ from the first CDF $120_A$). In this manner, second CDF $120_B$ maintains copies of CDRs until receiving notification from first CDF $120_A$ that the CDRs have been successfully delivered to CGF 130.

The operation of charging architecture 100 proceeds in this manner until first CDF $120_A$ fails.

The first CDF $120_A$ fails, and the second CDF $120_B$ becomes the primary CDF. The second CDF $120_B$ establishes an active connection with CGF 130 via communication path $125_B$. The active connection between second CDF $120_B$ and CGF 130 may be supported using any suitable protocol. In one embodiment, for example, the active connection between the second CDF $120_B$ and the CGF 130 may be supported using the GTP' protocol.

The second CDF $120_B$, at the time at which it becomes the primary CDF, has information suitable for preventing loss of CDRs. The second CDF $120_B$ buffers each of the CDRs received from MG 110. The second CDF $120_B$, at the time at which first CDF $120_A$ fails, is buffering copies of each of the CDRs that (1) have been received by first CDF $120_A$ from MG 110 but have not yet been transmitted from first CDF $120_A$ toward CGF 130 (i.e., they are still buffered within first CDF $120_A$ awaiting transmission toward CGF 130) and (2) have been transmitted by first CDF $120_A$ to CGF 130 but for which associated acknowledgment messages have not yet been received at second CDF $120_B$ from first CDF $120_A$ (e.g., because the first CDF $120_A$ had not yet received the acknowledgment messages from CGF 130 prior to failure of the first CDF $120_A$, because the first CDF $120_A$ received the acknowledgment messages from CGF 130 but did not send the associated sequence numbers to second CDF $120_B$ prior to failure of the first CDF $120_A$, or because the first CDF $120_A$ received the acknowledgment messages from CGF 130 and sent the associated sequence numbers toward second CDF $120_B$ prior to failure of the first CDF $120_A$ but the sequence numbers have not yet been received by the second CDF $120_B$). These CDRs that are buffered at second CDF $120_B$ at the time of failure of first CDF $120_A$ are referred to herein as pending CDRs.

The second CDF $120_B$ determines the state of each of the pending CDRs where, for each pending CDR, the state is indicative of whether or not that CDR was received at CGF 130. The second CDF $120_B$ determines the state of each of the pending CDRs by querying the CGF 130 for each of the pending CDRs in order to determine, for each of the pending CDRs, whether or not that CDR was received at CGF 130. The second CDF $120_B$ queries the CGF 130 for the pending CDRs based on the sequence numbers of the pending CDRs. The query may be performed in any suitable manner (e.g., using a separate query request message for each pending CDR, using one or more query request messages specifying one or more ranges of sequence numbers of pending CDRs, and the like). The CGF 130 receives the query request message(s) from second CDF $120_B$. The CGF 130 determines, for each of the pending CDRs for which status is requested, whether or not the associated CDR was received at CGF 130. The CGF 130 responds to the query request message(s) with a query response including the current state of each of the pending CDRs. The query response may be provided in any suitable manner (e.g., using a separate query response message for each pending CDR, using one or more query response messages specifying one or more ranges of sequence numbers of pending CDRs, and the like). The second CDF $120_B$ receives the query response message(s) from CGF 130. The second CDF $120_B$ determines the state of each of the pending CDRs based on the query response message(s) received from CGF 130.

The second CDF $120_B$ begins forwarding CDRs to CGF 130. The second CDF 120B begins forwarding CDRs to CGF 130 based on determined statuses of the pending CDRs, e.g., pending CDRs acknowledged by the CGF 130 as having been received from first CDF $120_A$ are not sent from second CDF $120_B$ to CGF 130 and pending CDRs indicated by the CGF 130 as not having been received from first CDF $120_A$ are sent from second CDF $120_B$ to CGF 130.

The second CDF $120_B$ continues sending CDRs to CGF 130 as long as second CDF $120_B$ is the primary CDF.

In this manner, CDRs generated by MG 110 are reliably delivered to CGF 130 such that CGF 130 may then provide the CDRs for use in various accounting functions, billing functions, and the like, as well as various combinations thereof.

In one embodiment, as depicted and described with respect to FIG. 1, the charging detail record transmission capability may be provided within a charging architecture in which the CDFs are implemented as standalone elements separate from the MG.

In one embodiment, the charging detail record transmission capability may be provided within a charging architecture in which the CDFs are implemented within the MG. An exemplary charging architecture according to one such embodiment is depicted and described with respect to FIG. 2.

Figure 2:
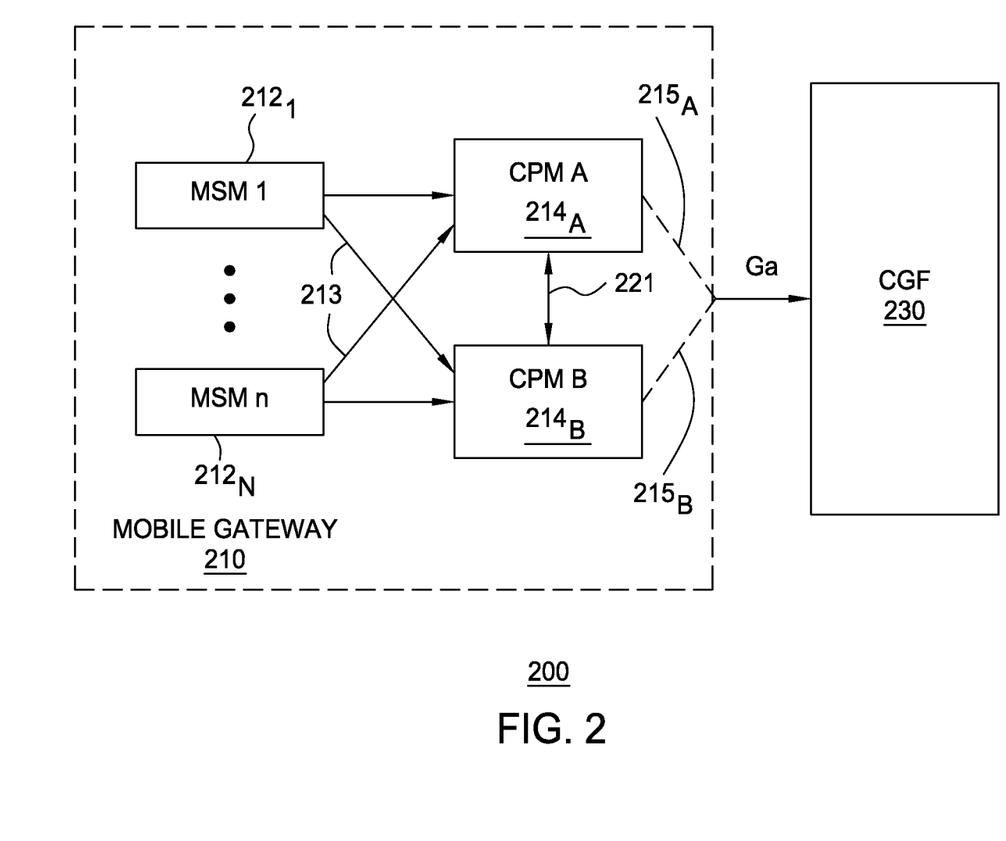
FIG. 2 depicts a high-level block diagram of an exemplary charging architecture.

FIG. 2 depicts a high-level block diagram of an exemplary charging architecture.

The charging architecture 200 includes a mobile gateway (MG) 210 and a charging gateway function (CGF) 230.

The MG 210 includes a plurality of mobile switching modules (MSMs) $212_1$-$212_N$ (collectively, MSMs 212). The typical operation of MSMs 212 of MG 210 will be understood by one skilled in the art.

The MG 210 also includes first and second Communications Processor Modules (CPMs) $214_A$ and $214_B$ (collectively, CPMs 214). In this embodiment, CPMs $214_A$ and $214_B$ support functionality substantially similar to functionality of first CDF $120_A$ and second CDF $120_B$ of FIG. 1, respectively. In one embodiment, the CPMs 214 also may provide other functions within MG 210.

The MSMs $212_1$-$212_N$ each communicate with both of the CPMs 214 via respective communication paths 213. The first and second CPMs $214_A$ and $214_B$ communicate with CGF 230 via communication paths $215_A$ and $215_B$, respectively.

In one embodiment, charging architecture 200 is implemented within a 3GPP UMTS network. In one such embodiment, charging architecture 200 is implemented as a modified version of the 3GPP TS 32.240 charging architecture.

The MSMs $212_1$-$212_N$ each generate charging detail records (CDRs), which include details about chargeable events for use in billing customers. The CDRs have unique sequence numbers associated therewith.

The MSMs $212_1$-$212_N$ each propagate their generated CDRs to both the first CPM $214_A$ and the second CPM $214_B$. The CDRs may be propagated in any suitable manner.

The first and second CPMs $214_A$ and $214_B$ receive the CDRs from the MSMs $212_1$-$212_N$. The first and second CPMs $214_A$ and $214_B$ each buffer the received CDRs.

The first CPM $214_A$ is the primary CPM and the second CPM $214_B$ is the secondary CPM. The first CPM $214_A$ has an active connection with CGF 230 via communication path $215_A$. The second CPM $214_B$ does not have an active connection with CGF 230. The active connection between first CPM $214_A$ and CGF 230 may be supported using any suitable protocol. In one embodiment, for example, the active connection between the first CPM $214_A$ and the CGF 230 may be supported using the GTP' protocol.

The first CPM $214_A$ begins sending the buffered CDRs to CGF 230 via the active connection established between first CPM $214_A$ and CGF 230.

In one embodiment, in which the GTP' protocol is used, first CPM $214_A$ sends the CDRs to CGF 230 using GTP' packets. In one such embodiment, for example, the CDRs may be sent using GTP' Data Record Transfer Request messages in which the Packet Transfer Command IE has a value of "Send Data Record Packet."

The second CPM $214_B$ continues to buffer the CDRs, but does not send the CDRs to CGF 230.

The CGF 230 receives the CDRs from first CPM $214_A$ and, for each CDR successfully received from first CPM $214_A$, replies to first CPM $214_A$ with an associated acknowledgment message. The acknowledgment message for a CDR includes the associated sequence number of the CDR.

In one embodiment, in which the GTP' protocol is used, CGF 230 sends the acknowledgment messages to first CPM $214_A$ using GTP' packets. The acknowledgment messages may be sent using GTP' Data Record Transfer Response messages in which the Cause value is "Request Accepted."

The first CPM $214_A$ receives the acknowledgment messages from CGF 230.

The first CPM $214_A$ deletes successfully delivered CDRs from its buffer in response to receiving acknowledgment of successful delivery (as determined from the sequence numbers of the CDRs, which are included within the acknowledgment messages received from CGF 230).

The first CPM $214_A$ notifies the second CPM $214_B$ of each CDR that is acknowledged by CGF 230 as having been received by CGF 230, thereby providing second CPM $214_B$ with information indicative of which of the CDRs received and buffered at second CPM $214_B$ have been successfully delivered to CGF 230. The first CPM $214_A$ may notify second CPM $214_B$ of successful delivery of a CDR in any suitable manner (e.g., by forwarding the associated acknowledgment message received from CGF 230 to second CPM $214_B$, by generating an acknowledgment message and sending the acknowledgment message to second CPM $214_B$, and the like).

The second CPM $214_B$ receives the notifications from first CPM $214_A$, such that second CPM $214_B$ has information indicative of which of the CDRs received and buffered at second CPM $214_B$ have been successfully delivered to CGF 230. The second CPM $214_B$ deletes successfully delivered CDRs from its buffer (as determined from the notifications received at the second CPM $214_B$ from the first CPM $214_A$). In this manner, second CPM $214_B$ maintains copies of CDRs until receiving notification from first CPM $214_A$ that the CDRs have been successfully delivered to CGF 230.

The operation of charging architecture 200 proceeds in this manner until first CPM $214_A$ fails.

The first CPM $214_A$ fails, and the second CPM $214_B$ becomes the primary CPM. The second CPM $214_B$ establishes an active connection with CGF 230 via communication path $215_B$. The active connection between second CPM $214_B$ and CGF 230 may be supported using any suitable protocol. In one embodiment, for example, the active connection between second CPM $214_B$ and CGF 230 may be supported using the GTP' protocol.

The second CPM $214_B$, at the time at which it becomes the primary CPM, has information suitable for preventing loss of CDRs. The second CPM $214_B$ buffers each of the CDRs received from each of the MSMs 212 of MG 210. The second CPM $214_B$, at the time at which first CPM $214_A$ fails, is buffering copies of each of the CDRs that (1) have been received by first CPM $214_A$ from the MSMs 212 of MG 110 but have not yet been transmitted from first CPM $214_A$ toward CGF 230 (i.e., they are still buffered within first CPM $214_A$ awaiting transmission toward CGF 230) and (2) have been transmitted by first CPM $214_A$ to CGF 230 but for which associated acknowledgment messages have not yet been received at second CPM $214_B$ from first CPM $214_A$ (e.g., because the first CPM $214_A$ had not yet received the acknowledgment messages from CGF 230 prior to failure of the first CPM $214_A$, because the first CPM $214_A$ received the acknowledgment messages from CGF 230 but did not send the associated sequence numbers to second CPM $214_B$ prior to failure of the first CPM $214_A$, or because the first CPM $214_A$ received the acknowledgment messages from CGF 230 and sent the associated sequence numbers toward second CPM $214_B$ prior to failure of the first CPM $214_A$ but the sequence numbers have not yet been received by the second CPM $214_B$). These CDRs that are buffered at second CPM $214_B$ at the time of failure of first CPM $214_A$ are referred to herein as pending CDRs.

The second CPM $214_B$ determines the state of each of the pending CDRs where, for each pending CDR, the state is indicative of whether or not that CDR was received at CGF 230.

The second CPM $214_B$ determines the state of each of the pending CDRs by querying the CGF 230 for each of the pending CDRs in order to determine, for each of the pending CDRs, whether or not that CDR was received at CGF 230. The second CPM $214_B$ queries the CGF 230 for the pending CDRs based on the sequence numbers of the pending CDRs. The query may be performed in any suitable manner (e.g., using a separate query request message for each pending CDR, using one or more query request messages specifying one or more ranges of sequence numbers of pending CDRs, and the like). The second CPM $214_B$ sends query request message(s) to the CGF 230.

In one embodiment, in which the GTP' protocol is used, second CPM $214_B$ sends the query request messages to CGF 230 using GTP' packets. In one such embodiment, the GTP' packets may be sent as GTP' Data Record Transfer Request messages in which the Data Packet Record IE is empty (rather than including a CDR) while other header portions of the GTP' Data Record Transfer Request messages are present.

The CGF 230 receives the query request message(s) from second CPM $214_B$. The CGF 230 determines, for each of the pending CDRs for which status is requested, whether or not the associated CDR was received at CGF 230. The CGF 230 responds to the query request message(s) with a query response including the current state of each of the pending CDRs. The query response may be provided in any suitable manner (e.g., using a separate query response message for each pending CDR, using one or more query response messages specifying one or more ranges of sequence numbers of pending CDRs, and the like). The CGF 230 sends the query response message(s) to the second CPM $214_B$.

In one embodiment, in which the GTP' protocol is used, CGF 230 sends the query response messages to second CPM $214_B$ using GTP' packets. The information included within a GTP' packet for a pending CDR depends on the current status of the pending CDR.

In one embodiment, if the CDR was not successfully received at CGF 230, the query response message sent by CGF 230 is a Data Record Transfer Response message having a Cause value set to "Request Accepted" (or any other suitable value, which may be any value as long as the second CPM $214_B$ is configured to recognize that the value indicates that the CDR was not successfully received). In this case, the second CPM $214_B$ knows that the CDR associated with that sequence number must be sent to CGF 230.

In one embodiment, if the CDR was successfully received at CGF 230, the query response message sent by CGF 230 is a Data Record Transfer Response message having a Cause value set to "Request Fulfilled" (or any other suitable value, which may be any value as long as the second CPM $214_B$ is configured to recognize that the value indicates that the CDR was successfully received). In this case, the second CPM $214_B$ knows that the CDR associated with that sequence number does not need to be sent to CGF 230.

The second CPM $214_B$ receives the query response message(s) from CGF 230.

The second CPM $214_B$ determines the state of each of the pending CDRs based on the query response message(s) received from CGF 230.

The second CPM $214_B$ begins forwarding CDRs to CGF 230. The second CPM $214_B$ begins forwarding CDRs to CGF 230 based on determined statuses of the pending CDRs, e.g., pending CDRs acknowledged by the CGF 230 as having been received from first CPM $214_A$ are not sent from second CPM $214_B$ to CGF 230 and pending CDRs indicated by the CGF 230 as not having been received from first CPM $214_A$ are sent from second CPM $214_B$ to CGF 230.

The second CPM $214_B$ continues sending CDRs to CPM 230 as long as second CPM $214_B$ is the primary CPM.

In this manner, CDRs generated by MG 210 are reliably delivered to CGF 230 such that CGF 230 may then provide the CDRs for use in various accounting functions, billing functions, and the like, as well as various combinations thereof.

Although the exemplary charging architectures of FIGS. 1 and 2 are primarily depicted and described within the context of a specific type of communication network utilizing specific protocols (namely, a 3GPP UMTS network using the GTP' protocol), it will be appreciated that the exemplary charging architectures of FIGS. 1 and 2 may be implemented within various other types of communication networks utilizing various other protocols (e.g., other types of wireless networks, wireline networks, and the like).

The operation of the exemplary charging architectures of FIGS. 1 and 2 in providing reliable transmission of CDRs may be better understood by way of an example.

Figure 3:
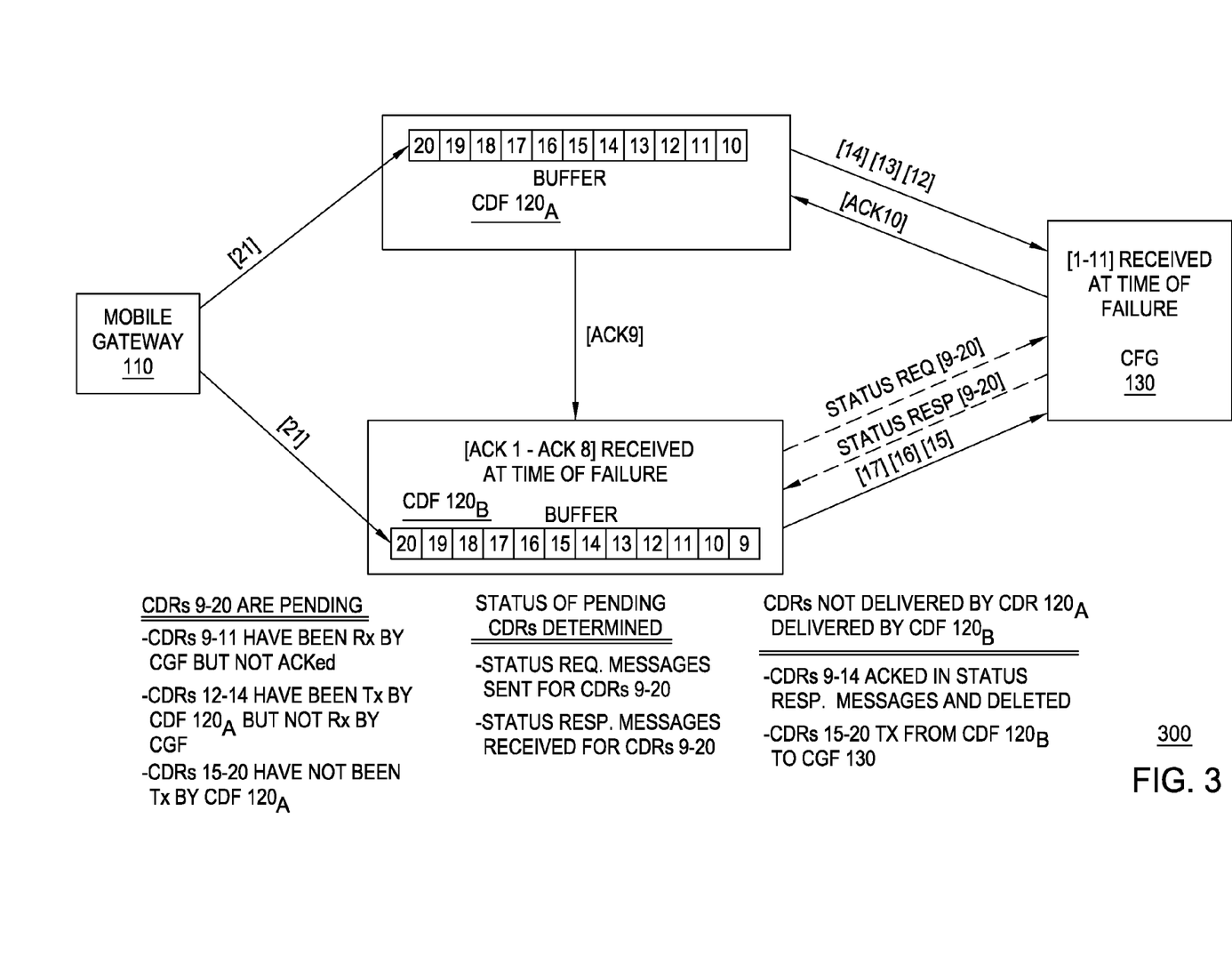
FIG. 3 depicts an exemplary use of the charging architecture of FIG. 1 for providing reliable delivery of charging detail records.

FIG. 3 depicts an exemplary use of the charging architecture of FIG. 1 for providing reliable delivery of charging detail records.

In this example, MG 110 has transmitted twenty CDRs (numbered 1 through 20) to both the first and second CDFs 120, and is in the process of transmitting a twenty-first CDR to both first and second CDFs 120. The first and second CDFs 120 have each buffered each of the twenty CDRs (1-20). The first CDF $120_A$ has transmitted the first fourteen CDRs (1-14) toward CGF 130. The CGF 130 has received the first eleven CDRs (1-11) from first CDF $120_A$. The CGF 130 has not yet received the next three CDRs (12-14) transmitted from the first CDF $120_A$ toward CGF 130 (i.e., the CDRs are currently in transit between CDF $120_A$ and CGF 130). The CGF 130 has transmitted, toward first CDF $120_A$, acknowledgment messages (ACK1-ACK10) acknowledging receipt of the first ten CDRs (1-10) at CDF $120_A$, but has not yet transmitted the acknowledgment message (ACK11) for the eleventh CDR (11). The first CDF $120_A$ has received acknowledgment messages (ACK1-ACK9) from CGF 130 for the first nine CDRs, but the acknowledgment message (ACK10) for the tenth CDR is still in transit from CGF 130 to first CDF $120_A$. The first CDF $120_A$, upon receiving each of the acknowledgment messages from CGF 130, removes the associated CDR from its buffer. Thus, the CDRs that have been received by first CDF $120_A$ but which have not yet been acknowledged from CGF 130 to first CDF $120_A$ (10-20) are currently buffered within first CDF $120_A$, i.e., the first nine CDRs (1-9) were removed from the buffer of first CDF $120_A$ as the associated acknowledgment messages (ACK1-ACK9) for these CDRs (1-9) were received at first CDF $120_A$ from CGF 130. The first CDF $120_A$ has informed second CDF $120_B$ of receipt of the acknowledgment messages (ACK1-ACK8) received from CGF 130 for the first eight CDRs (1-8). The first CDF $120_A$ has transmitted the acknowledgment message (ACK9) for the ninth CDR (9) toward second CDF $120_B$. The second CDF $120_B$ has received acknowledgment messages (ACK1-ACK8) for the first eight CDRs (1-8). The second CDF $120_B$, upon receiving each of the acknowledgment messages from first CDF $120_A$, removes the associated CDR from its buffer. Thus, the CDRs that have been received by second CDF $120_B$ but which have not yet been acknowledged from first CDF $120_A$ to second CDF $120_B$ (9-20) are currently buffered within second CDF $120_B$, i.e., the first eight CDRs (1-8) were removed from the buffer of second CDF $120_B$ as the associated acknowledgment messages (ACK1-ACK8) for these CDRs (1-8) were received at second CDF $120_B$ from first CDF $120_A$.

In this example, assume that first CDF $120_A$ fails at this time.

The second CDF $120_B$ assumes the role of primary CDF first CDF $120_A$ and, thus, is responsible for providing from MG 110 to CGF 130. The second CDF $120_B$ determines which of the CDRs are currently pending. The pending CDRs are those that are currently buffered within second CDF $120_B$ (9-20), which includes (a) CDRs that have been received by CGF 130 but for which the associated acknowledgments have not yet been received at second CDF $120_B$ (namely, CDRs 9-11), (b) CDRs that have by transmitted by first CDF $120_A$ but not yet received by CGF 130 (namely, CDRs 12-14), and (c) CDRs that have been received by first CDF $120_A$ but have not yet been transmitted from first CDF $120_A$ toward CGF 130.

The second CDF $120_B$ sends status request messages to CGF 130 for each of the pending CDRs (9-20). The CGF 130 receives the status request messages from the second CDF $120_B$, determines the requested status for each of the CDRs (i.e., for each status request, CGF 130 determines whether or not the associated CDR was received at CGF 130 from first CDF $120_A$), and replies to second CDF $120_B$ with associated status response messages. The second CDF $120_B$ receives the associated status response messages. The second CDF $120_B$ determines, from the status response messages, which of the pending CDRs have been delivered to CGF 130 and which of the pending CDRs still need to be delivered to CGF 130.

The three CDRs received by CGF 130 but for which acknowledgment was not yet received by second CDF $120_B$ at the time of failure of first CDF $120_A$ (namely, CDRs 9-11) and the three CDRs in transit from first CDF $120_A$ to CGF 130 at the time of failure of the first CDF $120_A$ (namely, CDRs 12-14) have all been received at CGF 130 by the time second CDF $120_B$ initiates the status request messages for these CDRs. As a result, the status response messages received at second CDF $120_B$ for CDRs 9-14 each indicate that these CDRs have already been received at CGF 130, such that second CDF $120_B$ does not need to provide these CDRs to CGF 130.

The other pending CDRs (15-20), however, were buffered within first CDF $120_A$ at the time of failure of first CDF $120_A$ and, thus, were not delivered to CGF 130. As a result, the status response messages received at second CDF $120_B$ for CDRs 15-20 each indicate that these CDRs have not yet been received at CGF 130, such that second CDF $120_B$ may then provide these CDRs to CGF 130.

As depicted in FIG. 3, second CDF $120_B$ begins transmitting CDRs to CGF 130 starting with CDF 15.

As may be seen from the example of FIG. 3, the charging detail record transmission capability prevents loss of CDRs even upon failure of a primary CDF that is responsible for propagating the CDRs from the MG to the CGF.

Figure 4:
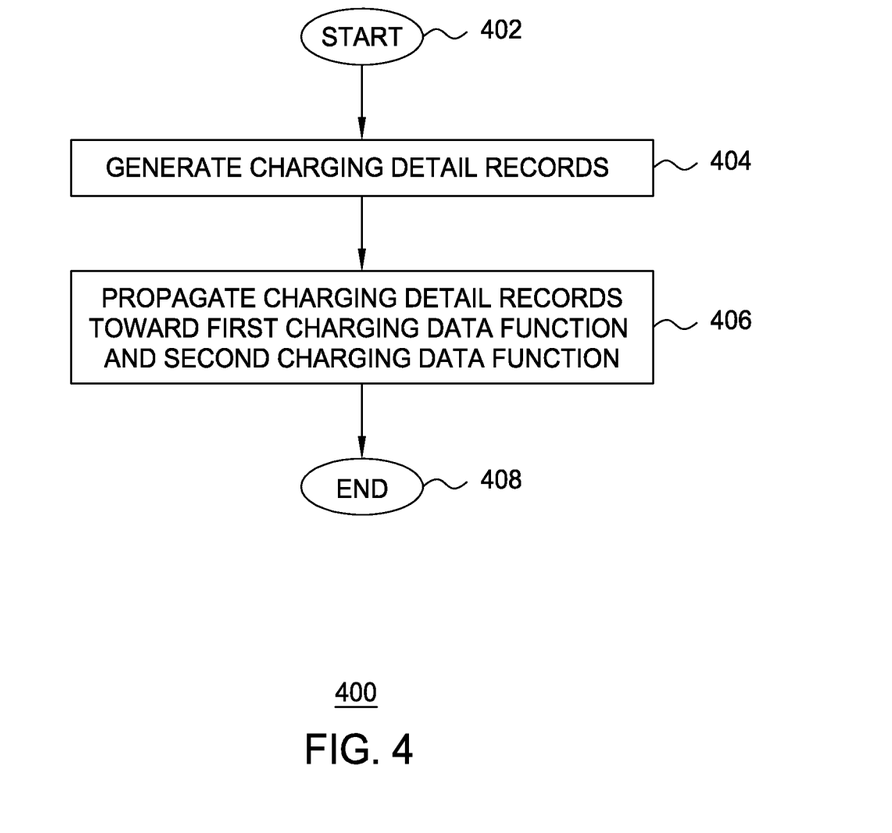
FIG. 4 depicts one embodiment of a method for use by a mobile gateway in providing reliable transmission of charging detail records to a charging gateway function.

FIG. 4 depicts one embodiment of a method for use by a mobile gateway (MG) in providing reliable transmission of charging detail records (CDRs) to a charging gateway function (CGF). At step 402, method 400 begins. At step 404, the MG generates CDRs. At step 406, each of the CDRs is propagated toward both a first CDF and a second CDF. In one embodiment, the first CDF and second CDF are internal to the MG and, thus, the CDRs are propagated within the MG. In one embodiment, the first CDF and second CDF are external to the MG and, thus, are propagated from the MG toward the first and second CDFs using any suitable communication paths. At step 408, method 400 ends. The operation of method 400 may be better understood by way of reference to FIGS. 1-3.

Figure 5:
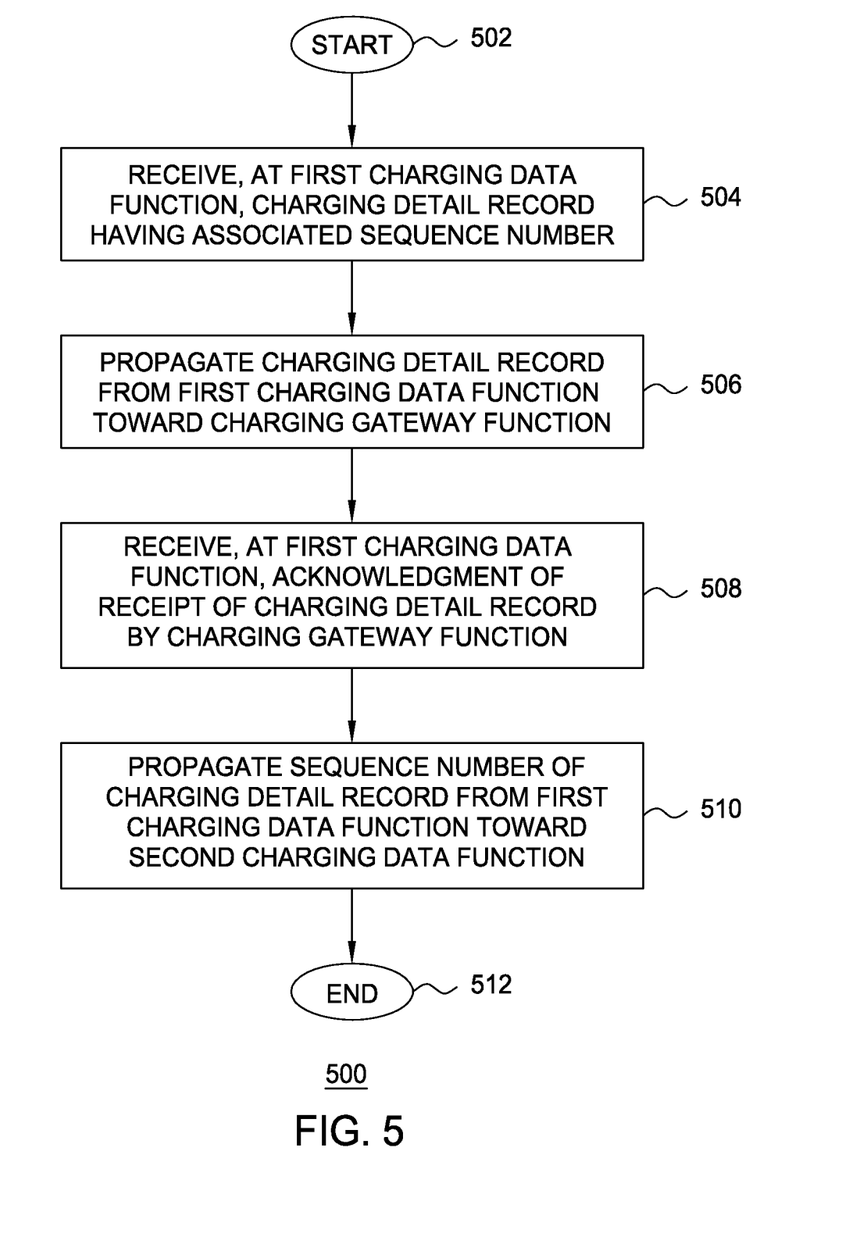
FIG. 5 depicts one embodiment of a method for use by a charging data function, operating as an active charging data function, in providing reliable transmission of charging detail records to a charging gateway function.

FIG. 5 depicts one embodiment of a method for use by a charging data function (CDF), operating as an active CDF, in providing reliable transmission of charging detail records (CDRs) to a charging gateway function (CGF). The active CDF is denoted as a first CDF and cooperates with a second, backup CDF to support reliable transmission of CDRs. At step 502, method 500 begins. At step 504, the first CDF receives a CDR having an associated sequence number. At step 506, the first CDF propagates the CDR toward a CGF. At step 508, the first CDF receives, from the CGF, acknowledgment of receipt of the CDR by the CGF. At step 510, the first CDF propagates the sequence number of the CDR toward the second CDF, which is configured for receiving a copy of the CDR that was received at the first CDF. At step 512, method 500 ends. The operation of method 500 may be better understood by way of reference to FIGS. 1-3.

Figure 6:
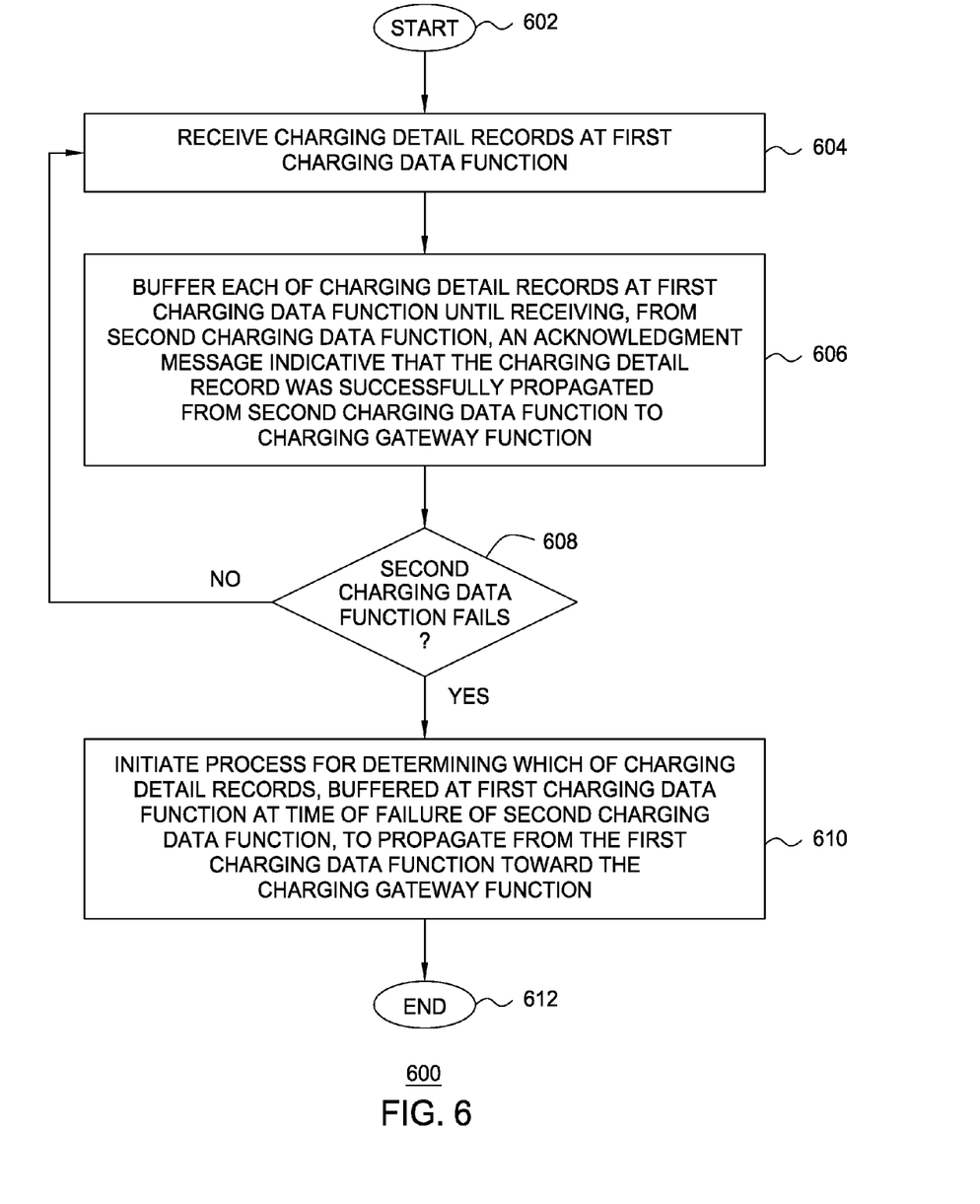
FIG. 6 depicts one embodiment of a method for use by a charging data function, operating as a backup charging data function, in providing reliable transmission of charging detail records to a charging gateway function.

FIG. 6 depicts one embodiment of a method for use by a charging data function (CDF), operating as a backup CDF, in providing reliable transmission of charging detail records (CDRs) to a charging gateway function (CGF). The backup CDF is denoted as a first CDF and cooperates with a second, active CDF to support reliable transmission of CDRs.

At step 602, method 600 begins.

At step 604, the first CDF receives CDRs.

At step 606, the first CDF buffers the CDRs. The first CDF buffers each CDR until receiving, from the second CDF, an acknowledgment message indicative that the CDR was successfully propagated from the second CDF to the CGF.

At step 608, a determination is made as to whether the second CDF fails. The first CDF may detect and/or be informed of the failure of the first CDF in any suitable manner. As long as the second CDF has not failed, the first CDF continues to receive and buffer CDRs (i.e., method 600 returns to step 604). When a determination is made that the second CDF has failed, method 600 proceeds to step 610 (it will be appreciated that in this case, the first CDF continues to receive and buffer CDFs as depicted and described with respect to steps 604 and 606).

At step 610, the first CDF initiates a process for determining which of the CDRs, buffered at the first CDF at the time of failure of the second CDF, to propagate from the first CDF toward the CGF.

At step 612, method 600 ends.

The operation of method 600 may be better understood by way of reference to FIGS. 1-3.

Although primarily depicted and described herein within the context of providing reliable transmission of CDRs having specific types of information used for specific purposes, it will be appreciated that the charging detail record transmission capability may be utilized for providing reliable transmission of CDRs having any suitable types of information useful for any suitable purposes.

Although primarily depicted and described herein within the context of providing reliable transmission of CDRs within specific types of networks, it will be appreciated that the charging detail record transmission capability may be utilized for providing reliable transmission of CDRs in various other types of communication networks.

Although primarily depicted and described herein within the context of providing reliable transmission of CDRs, it will be appreciated that principles of the charging detail record transmission capability may be utilized to provide reliable transmission of other suitable types of records and data for which reliable transmission of the records or data is required or desirable.

Figure 7:
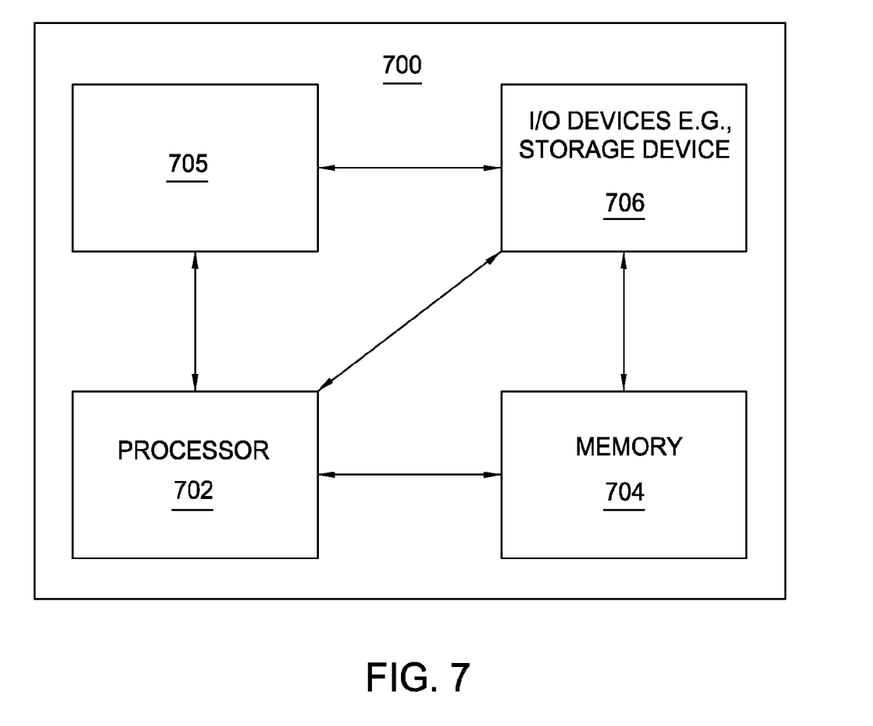
FIG. 7 depicts a high-level block diagram of a computer suitable for use in performing the functions described herein.

FIG. 7 depicts a high-level block diagram of a computer suitable for use in performing functions described herein.

As depicted in FIG. 7, computer 700 includes a processor element 702 (e.g., a central processing unit (CPU) and/or other suitable processor(s)), a memory 704 (e.g., random access memory (RAM), read only memory (ROM), and the like), a cooperating module/process 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 705 can be loaded into memory 704 and executed by processor 702 to implement the functions as discussed herein. Thus, cooperating process 705 (including associated data structures) can be stored on a computer readable storage medium, e.g., RAM memory, magnetic or optical drive or diskette, and the like.

It will be appreciated that computer 700 depicted in FIG. 7 provides a general architecture and functionality suitable for implementing functional elements described herein and/or portions of functional elements described herein. For example, the computer 700 provides a general architecture and functionality suitable for implementing one or more of an MG (e.g., the MG 110 in which CDFs are external to the MG 110, the MG 210 in which CDFs are implemented using CPMs 214 within MG 210, one or more MSMs of a mobile gateway, and the like), a standalone CDF (e.g., first CDF $120_A$ and/or second CDF $120_B$), a CDF implemented as a CPM of a mobile gateway (e.g., CPM $214_A$ and/or CPM $214_B$), a CGF, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
   generating a plurality of charging detail records (CDRs) at a mobile gateway (MG); and
   propagating each of the CDRs toward a first charging data function (CDF) and a second CDF, wherein the first CDF is configured for propagating CDRs toward a charging gateway function (CGF) upon receiving the CDRs, wherein the second CDF is configured for propagating CDRs toward the CGF when the first CDF fails.

2. The method of claim 1, wherein the CDRs are generated by a mobile switching module (MSM) of the MG.

3. The method of claim 1, wherein the first CDF and the second CDF are each external to the MG.

4. The method of claim 1, wherein the first CDF is a first module of the MG and the second CDF is a second module of the MG.

5. The method of claim 1, wherein each of the CDRs is propagated using the GPRS Tunnelling Protocol prime (GTP') protocol.

6. The method of claim 1, wherein each of the CDRs has a respective sequence number associated therewith.

7. An apparatus, comprising:
   a processor and a memory communicatively connected to the processor, the processor configured to:
   generate a plurality of charging detail records (CDRs) at a mobile gateway (MG); and
   propagate each of the CDRs toward a first charging data function (CDF) and a second CDF, wherein the first CDF is configured for propagating CDRs toward a charging gateway function (CGF) upon receiving the CDRs, wherein the second CDF is configured for propagating CDRs toward the CGF when the first CDF fails.

8. The apparatus of claim 7, wherein the CDRs are generated by a mobile switching module (MSM) of the MG.

9. The apparatus of claim 7, wherein the first CDF and the second CDF are each external to the MG.

10. The apparatus of claim 7, wherein the first CDF is a first module of the MG and the second CDF is a second module of the MG.

11. The apparatus of claim 7, wherein each of the CDRs is propagated using the GPRS Tunnelling Protocol prime (GTP') protocol.

12. The apparatus of claim 7, wherein each of the CDRs has a respective sequence number associated therewith.

13. A non-transitory computer-readable storage medium storing instructions which, when executed by a computer, cause the computer to perform a method, the method comprising:
   generating a plurality of charging detail records (CDRs) at a mobile gateway (MG); and propagating each of the CDRs toward a first charging data function (CDF) and a second CDF, wherein the first CDF is configured for propagating CDRs toward a charging gateway function (CGF) upon receiving the CDRs, wherein the second CDF is configured for propagating CDRs toward the CGF when the first CDF fails.

14. The non-transitory computer-readable storage medium of claim 13, wherein the CDRs are generated by a mobile switching module (MSM) of the MG.

15. The non-transitory computer-readable storage medium of claim 13, wherein the first CDF and the second CDF are each external to the MG.

16. The non-transitory computer-readable storage medium of claim 13, wherein the first CDF is a first module of the MG and the second CDF is a second module of the MG.

17. The non-transitory computer-readable storage medium of claim 13, wherein each of the CDRs is propagated using the GPRS Tunnelling Protocol prime (GTP') protocol.

18. The non-transitory computer-readable storage medium of claim 13, wherein each of the CDRs has a respective sequence number associated therewith.

\* \* \* \* \*